Oct. 26, 1965

C. B. KING 3,213,755

METHOD AND MACHINE FOR PRODUCING
SPIRAL BEVEL AND HYPOID GEARS

Filed Sept. 26, 1963

INVENTOR.
CHARLES B. KING
BY Richard W. Treverton
ATTORNEY

Oct. 26, 1965    C. B. KING    3,213,755
METHOD AND MACHINE FOR PRODUCING
SPIRAL BEVEL AND HYPOID GEARS
Filed Sept. 26, 1963    5 Sheets-Sheet 2

FIG. 15
FIG. 16
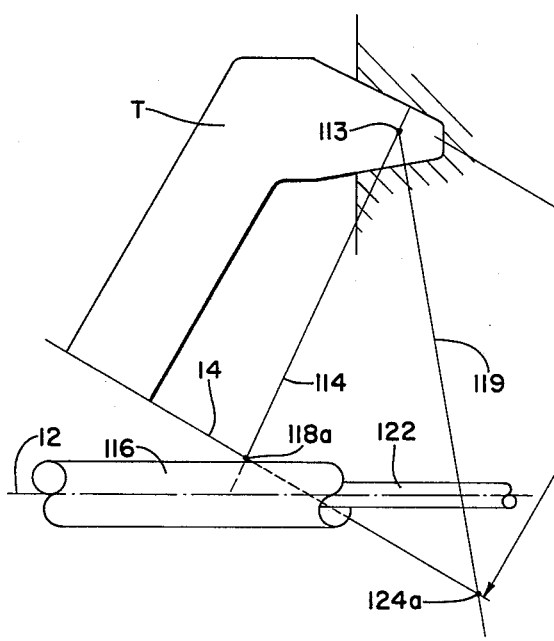
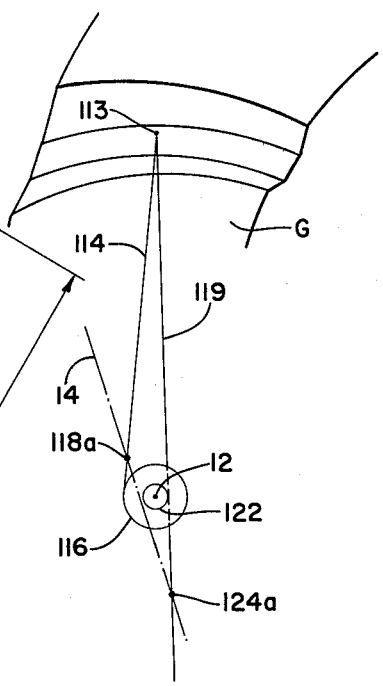

United States Patent Office 3,213,755
Patented Oct. 26, 1965

3,213,755
METHOD AND MACHINE FOR PRODUCING SPIRAL BEVEL AND HYPOID GEARS
Charles B. King, Rochester, N.Y., assignor to The Gleason Works, Rochester, N.Y., a corporation of New York
Filed Sept. 26, 1963, Ser. No. 311,704
17 Claims. (Cl. 90—5)

The present invention relates to a method and machine for cutting non-generated spiral bevel and hypoid gears by swinging a rotating cutting tool about an axis inclined at an acute angle to its rotation axis, to thereby produce tooth surfaces of conical or helicoidal shape whose cone or helix axis coincides with the swing axis.

An object of the invention is a cutting method and machine in which, for improved efficiency, a substantial amount of stock is removed from each tooth space by plunge cutting during the relative infeed between the tool and work which necessarily occurs following the relative withdrawal for tooth-to-tooth indexing of the work.

Another object is a cutting method which may be used for example for roughing, close to finished size, gears to be finished by grinding, or by a prior method disclosed in application Serial No. 705,931, filed by L. O. Carlsen and myself on December 30, 1957, now Patent No. 3,110,-225, granted November 12, 1963, with a milling cutter having a greater number of cutting blades than has been feasible with said prior method.

Another object is a method and machine in which the rotation axis of the swinging tool is offset from the axis of swing; and a related object, applicable to the cutting of tooth surfaces of involute helicoidal form, is a method and machine in which the tool rotation axis is positioned substantially in a plane which is normal to the helicoidal tooth surface and parallel to the axis of swing, whereby the instantaneous line of contact between the cutting surface of the tool and tooth surface also lies in such normal plane. With this arrangement the generatrix of the helicoidal surface corresponds to the cutting profile of the tool, irrespective of the diameter of the tool, making for ease of manufacture when the tool is a milling cutter and for ease of redressing when the tool is a grinding wheel.

Still another object of the invention is a machine in which the tool-carrying cradle and the work spindle support are relatively adjustable in such manner that the cradle axis may represent either the axis of an imaginary generating gear, about which the tool is rotated in producing gears or pinions by the rolling generating process, or the axis about which the tool is swung in producing the longitudinally curved tooth surfaces or tooth spaces of non-generated gears.

The foregoing and other objects and advantages will become apparent from the following description made with reference to the accompanying drawings, wherein.

Figure 1:
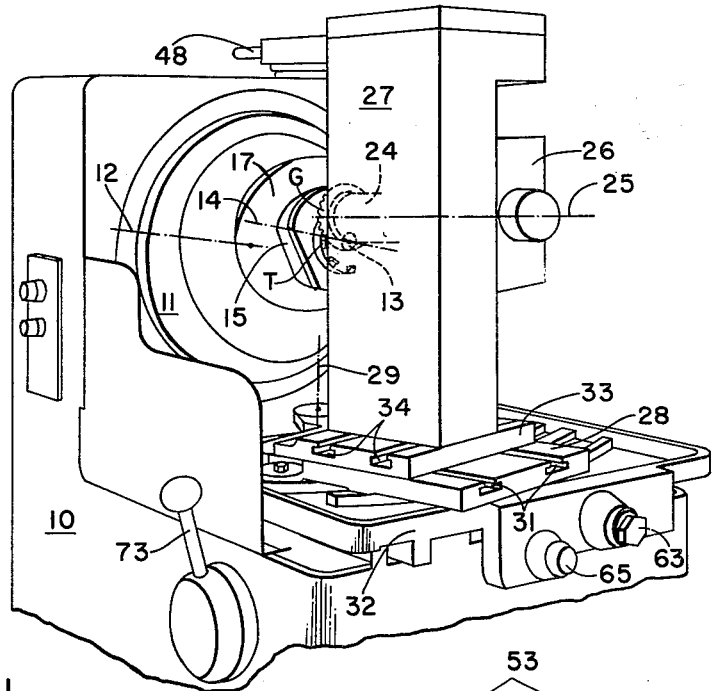
FIG. 1 is a perspective view and FIG. 2 a drive diagram of the machine.
Figure 3:
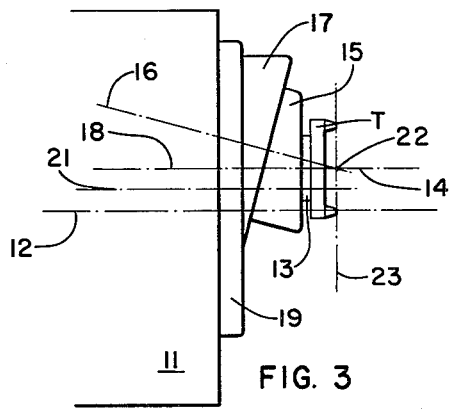
FIGS. 3 and 4 are views of the cutting tool and its support, illustrating the adjustability of the tool.
Figure 4:
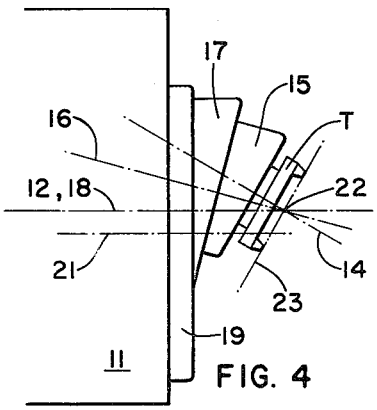

Referring to FIG. 1, the machine comprises a frame 10 supporting a tool-carrying cradle 11 for rotation about horizontal axis 12, the cutting tool T being either a face mill cutter or an annular grinding wheel of equivalent shape mounted on a spindle 13 whose rotation axis is designated 14. Referring to FIGS. 3 and 4 the spindle 13 is journaled for rotation in a housing 15 that is angularly adjustable, about tilt axis 16, in a swivel member 17. The latter is rotatably adjustable about swivel axis 18 in an eccentric 19 which in turn is adjustable about eccentric axis 21 in cradle 11. Axes 12 and 18 are parallel to and equally spaced from axis 21, so that by adjustment of eccentric 19 in the cradle, the swivel axis 18 may be made either coincident with cradle axis 12, as in FIG. 4, or spaced at any desired distance therefrom up to the maximum, equal to twice the spacing of axes 12 and 21, as shown in FIG. 3.

Axes 18 and 14 are inclined at equal acute angles to tilt axis 16 and both of them intersect the latter axis at point 22 in the tip plane 23 of the cutting tool T. By adjustment of the housing 15 in the swivel member, about axis 16, the cutter axis 14 may be made coincident with axis 18, as in FIG. 3, or inclined thereto at any angle up to the maximum, equal to twice the angle between axes 16 and 18, as shown in FIG. 4. Accordingly the tool rotation axis 14 may be brought to any desired angle with respect to the cradle axis 12 in either intersecting relation to the cradle axis 12 or at any desired offset thereto, within the adjustment range. Stated in another way, these adjustments enable universal angular adjustment of the cutter in relation to the cradle, and also enable the cutter to be set at any desired radial distance from the cradle axis, within the adjustment range of the machine. The mechanism by which the parts 15 and 17 are supported for these adjustments, and also by which the cutter may be gear driven from a shaft coincident with the cradle axis, is well known per se, and is shown in Patent No. 2,667,818 to A. L. Stewart et al.

Referring again to FIG. 1, the work gear or gear blank G is supported in a suitable work holder on a work spindle 24 journaled for rotation about horizontal axis 25 in a work head 26. A column 27 supports the work head for vertical adjustment thereon, to raise or lower the work spindle axis 25 relative to cradle axis 12. The column is supported by a swinging base 28 which is adjustable about a vertical axis 29 and has ways 31 extending in the direction of work spindle axis 25 to provide for adjustment of the column in the direction of that axis. The swinging base adjustment is relative to a sliding base 32 which is movable on the frame for adjustment and feed motions in the direction of cradle axis 12. In conventional machines having the afore-described adjustability of the cutter spindle 13, the adjustment axis 29 of the swinging base intersects at right angles both the cradle axis 12 and the work spindle axis 25 in all conditions of adjustment of the machine. According to the present invention a horizontal cross adjustment is provided to enable axis 29 to be offset from one of these axes 12, 25.

As shown in FIG. 1 such cross-adjustment is conveniently provided by a plate 33 interposed between column 27 and the swinging base 28. The plate is adjustable along the horizontal ways 31 and has guide slots 34 along which the column 27 is adjustable, the column in this respect constituting a cross slide adjustable in a direction at a right angle to upright axis 29 and also at a right angle to work spindle axis 25. Since these slots are perpendicular to horizontal ways 31, adjustment of the column along them enables the axis 25 to be offset from axis 29. The advantageous effect of the offsetting of axis 25 from axis 29 will be described hereinafter in connection with FIGS. 5 and 6. If desired, a similar effect could be obtained by means of a slide arranged to provide for horizontal adjustment of axis 29 relative to axis 12.

Figure 2:
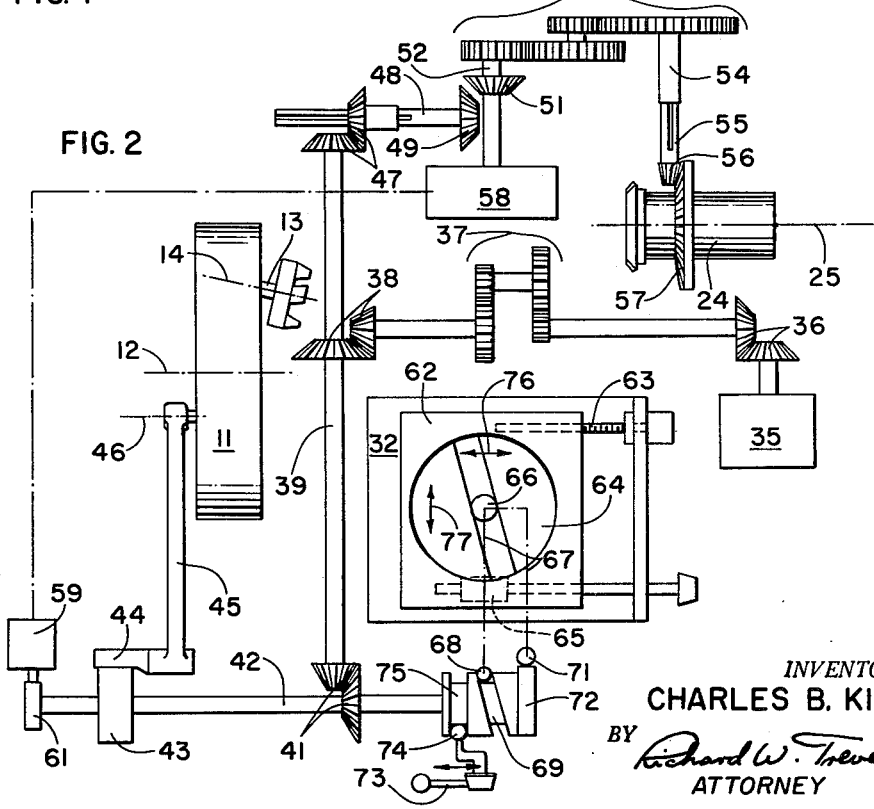

Referring to FIG. 2, the drive for the machine includes a motor 35, bevel gears 36, cycle speed change gears 37, bevel gears 38 and vertical shaft 39, all supported by frame 10. The cradle is driven from shaft 39 through bevel gears 41, horizontal shaft 42 and cradle roll cam 43. This cam when rotated oscillates a cam follower lever 44 that is fulcrumed on the frame and pivoted to a connecting rod 45 that is also pivoted, on axis 46, to the cradle 11, with the result that the cradle is rocked back and forth about axis 12 once for each revolution of the cam. Suitable biasing means, not shown, are provided to hold the follower lever 44 against the cam. The pivot on axis 46 is adjustable on the cradle around axis 12 by suitable means, not shown, to enable the cutter to be placed in any desired position around the latter axis. The lever 44 is of a kind which is adjustable, in a known manner, to vary the angle through which the cradle is rocked. If desired this lever and connecting rod 45 may be replaced by an adjustable ratio mechanism of the kind disclosed in Patent No. 3,046,799 to J. L. Ash II, et al.

The work spindle 24 is driven from shaft 39 through bevel gears 47; horizontal overhead shaft 48; bevel gears 49 and 51, shaft 52, index change gears 53, and upper section 54 of a telescoping vertical shaft, all supported in the upper portion of column 27; and lower section 55 of the vertical telescoping shaft, pinion 56 and gear 57 on spindle 24, all suported in work head 26. The gear 51 may be disengaged from gear 49 and the shaft 52 connected to an indexing mechanism 58 for intermittent rotation thereby. The indexing mechanism, controlled by an electrical switch 59 actuated by a cam 61 on shaft 42, may be of the kind disclosed in co-pending application Serial No. 311,712, filed on even date herewith by J. L. Ash II. This mechanism operates to rotate the shaft 52 through one turn upon each closure of switch 59, i.e. once during each revolution of shaft 42, to effect tooth-to-tooth advance of work spindle 24.

The feed mechanism for sliding base 32 may be substantially as disclosed in Patent 2,444,551 to O. F. Bauer. As shown schematically in FIG. 2 this mechanism includes a plate 62 adjustable on the sliding base 32, in the direction of the latter's sliding motion, by means of a screw 63, also shown in FIG. 1. A cross-slotted disc 64 is rotatably adjustable on the plate by means of a screw 65 (see also FIG. 1) to vary the inclination of the slot. A roller 66 in the slot is carried by a lever, schematically shown at 67, which is pivoted to the frame 10 for motion about two mutually perpendicular axes. The lever also carries two cam follower rollers, one being roller 68 engaged with feed cam 69 and the other being roller 71 engaged with cam 72. These cams are co-rotatable with shaft 42, and may be manually shifted axially thereon by a control lever 73 whose shaft supports eccentrically thereon a roller 74 that is engaged in a circumferential groove 75 in the body of cam 69.

The arrangement is such that upon rotation of shaft 42 the cam 69 acts to move roller 66 in the direction of arrow 76 to effect infeed and withdrawal motions of the sliding base (for work gear indexing), and that the cam 72 acts to move roller 66 in the direction of arrow 77. When the slot of disc 64 is inclined, i.e. is non-perpendicular to arrow 76, the motion of roller 66 effected by cam 72 also produces a motion of the sliding base in the direction of arrow 76, such motion being superimposed upon the sliding base motion produced by cam 69. The motion of the cam body effected through control lever 73 is also imparted to roller 66 through roller 68 and lever 67, and is employed to withdraw the sliding base to work-loading position after the cutting of a gear has been completed and then to advance the base to work-cutting position after a fresh gear or gear blank has been chucked to the work spindle.

For conventional gear generation as described in aforementioned Patent 2,444,551, gears 49 and 51 are engaged, cam 61 is removed and a cam 43 is employed which turns the cradle counterclockwise in constant velocity ratio to rotation of work spindle 24 and returns it, clockwise, more rapidly; and a cam 69 is employed which effects infeed of the sliding base 32 to engage the work with the rotating cutter T during the initial portion of the constant-velocity counterclockwise motion of the cradle and withdraws the sliding base during the terminal portion of such motion of the cradle to permit indexing of the work gear. Such indexing, to bring successive tooth spaces of the gear into cutting position, is effected by the continuing rotation of the gear during the idle clockwise return motion of the cradle.

Figure 5:
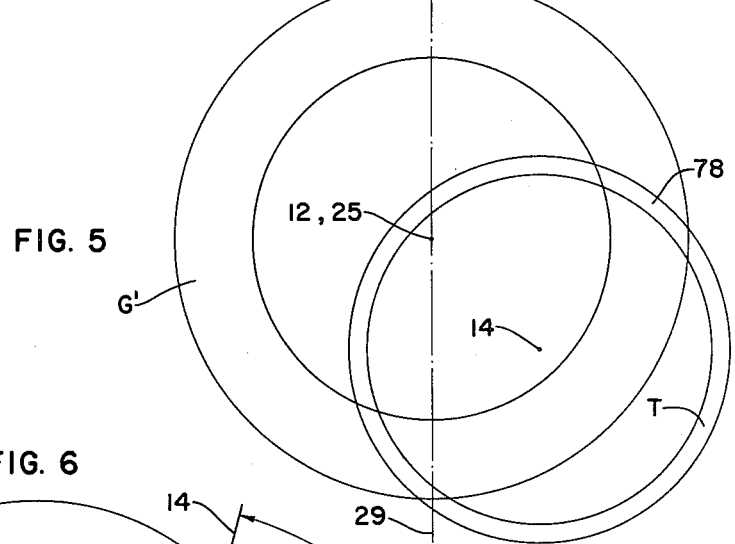
FIGS. 5 and 6 are diagrams illustrating two different conditions of adjustment of the machine.

In setting up the machine for such generation, the column 27 is adjusted along guide slots 34 to cause work axis 25 to intersect vertical axis 29, which also intersects the cradle axis 12. Referring to FIG. 5, the cutting surface of the rotating tool T, i.e. the surface of revolution about axis 14 described by the cutting edges of the rotating tool, then represent one tooth, 78, of an imaginary generating gear G' which, during cutting of each tooth space, is rotating in mesh with the work gear G, FIG. 1. The cradle axis 12 constitutes the axis of gear G' while the tool axis 14 is the axis of lengthwise curvature of the tooth 78.

Figure 6:
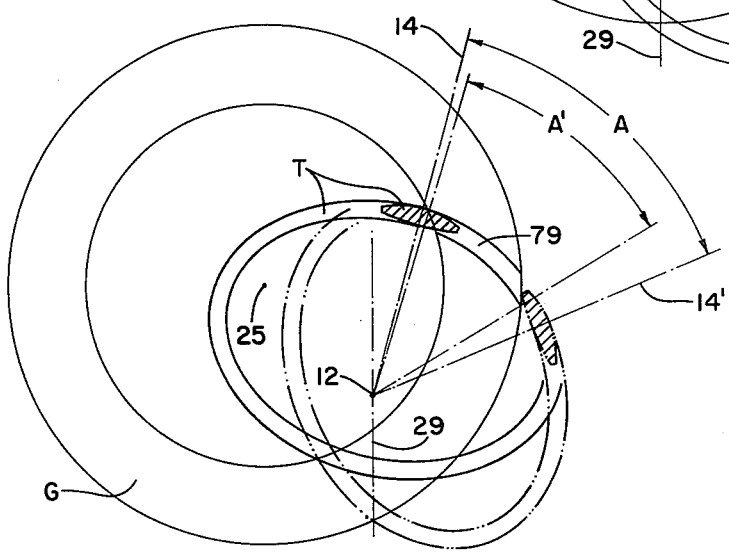

For cutting non-generated teeth, in accordance with the present invention, which have tooth sides that are either surfaces of revolution or helicoidal surfaces, the column 27 is adjusted horizontally on cross-adjustment plate 33, and the work head vertically on the column, so that, as shown in FIG. 6, the cradle axis 12 becomes the axis of such surfaces of revolution or helicoidal surfaces. The cradle swings to carry the tool about axis 12, moving the tool axis through angle A between the position wherein it is designated 14 and that designated 14' to sweep the tool from one end of a tooth space to the other. Thus the path of the cutting portion of the tool represents one or more surfaces of tooth slot 79 of a non-generated gear G whose axis either is coincident with axis 25, in the case where the work gear is a crown gear, or intersects axis 25 in the case of a tapered work gear. In the case of gear generation, FIG. 5, the cutter axis 14 may be either inclined or parallel to the cradle axis 12, depending upon the design of the generating gear G'; but in the case of cutting non-generated gears, FIG. 6, the cutter axis 14 must always be set at an angle to the cradle axis. However axis 14 may be in either intersecting or offset relation to axis 12, as will be discussed hereinafter.

Figure 7:
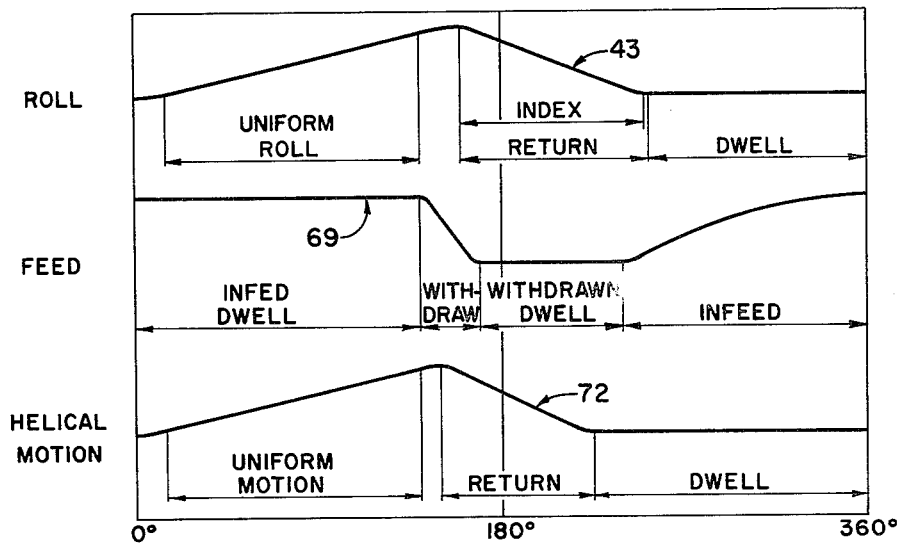
FIG. 7 is a cam diagram, showing the phase relation and shapes of the several cams in the machine drive.

For cutting without generation, as in FIG. 6, the gear 51, FIG. 2, is disengaged from gear 49, and cam 61 is installed to operate the index mechanism 58. Cams 43, 69 and 72 of substantially the form shown in FIG. 7 are installed. When employing a milling cutter (as distinguished from a grinding wheel) the sliding base 32 is preferably infed by cam 69 preceding the cutting roll of the cradle through angle A, so that the radially inner end of the tooth slot of the work gear is cut by plunge milling. During this infeed, stock is also removed to decreasing depth along the length of the tooth. Then, by action of cam 43, the cradle is swung through angle A, to complete the cutting of the tooth slot to the radially outer end thereof. It is possible, of course, to use the reverse direction of cradle roll for cutting, in which case the initial plunge cutting will occur at the radially outer end of the tooth space. At the conclusion of the cutting roll of the cradle the sliding base is withdrawn by cam 69, and then indexing of the work is effected by action of cam 61 and mechanism 58. The cycle is then repeated, beginning with infeed by cam 69. In the event helicoidal tooth surfaces are to be cut, a feed of the sliding base by cam 72 occurs throughout the cradle roll. The magnitude of the helical motion may be adjusted by changing the inclination of the slot in disc 64 by means of screw 65, FIG. 2, and if no such motion is required, i.e. if the teeth are to be cut as surfaces of revolution, the helical motion is made zero by adjusting the slot into perpendicularity to the feed direction 76. Referring to FIG. 6, it is preferred that the angle of swing A be somewhat greater than the angle A' which represents the actual extent of the tooth slot, in order that the rotary or helical path of the tool about axis 12 may be established slightly before and continued slightly after the finished surfaces of the slot are cut.

The phase relation between the cams is shown in FIG. 7. Cutting occurs when the "Uniform Roll" portion of cam 43 is effective, during which the infeed dwell of feed cam 69 and the "Uniform Motion" portion of the helical motion cam 72 are effective. Indexing occurs while the "Return" portions of roll cam 43 and helical motion cam 72 are effective, after the sliding base has been withdrawn by the "Withdraw" portion of feed cam 69. After indexing the "Dwell" of roll cam 43 holds the cradle stationary while the "Infeed" portion of feed cam 69 effects the plunge milling infeed with the tool axis at 14 in FIG. 6.

Figures 8, 9:
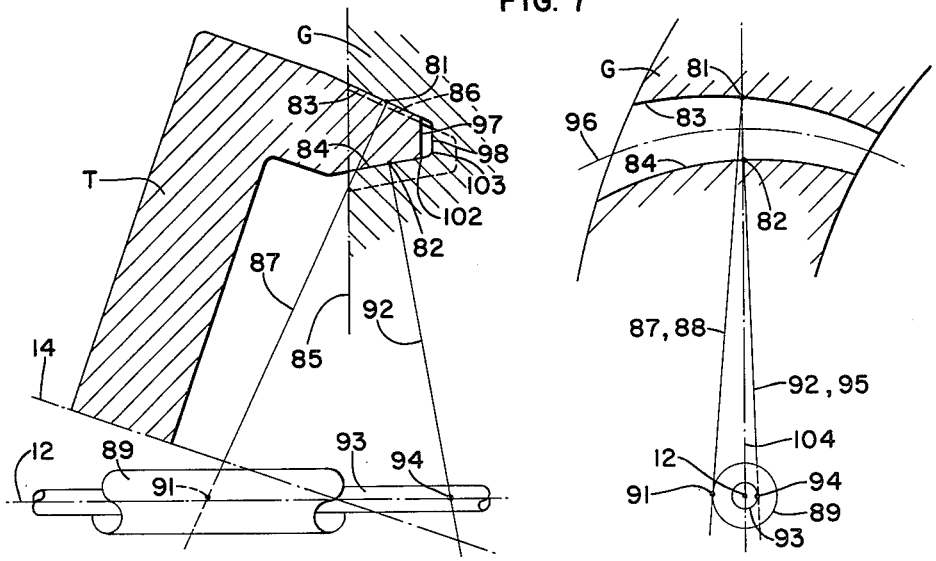
FIGS. 8 and 9 are diagrams, illustrating the relationship of the tool rotation and swing axes for cutting helicoidal tooth surfaces, these diagrams being respectively in a plane containing the swing axis and a plane perpendicular thereto.

The helicoidal tooth surfaces to be produced on the machine are ideally involute helicoids having straight line elements in normal planes parallel to the helix axis 12. FIG. 8 views the gear G and tool T approximately in a plane containing this axis 12 and mean points 81 and 82 of the opposite sides 83 and 84 of the tooth slot, while FIG. 9 views the slot in a plane through these points 81 and 82. The axis 12 is perpendicular to the face plane 85 of the gear or at least lies in a plane perpendicular to the face plane, and the tool, rotating about its own axis 14, is able to follow the tapering depth of the slot, from the mean section thereof shown in full lines in FIG. 8 to the radially outer end thereof shown by dotted lines 86, by relative movement along axis 12 as it swings about that axis.

Line 87 is normal to surface 83 at point 81. A plane 88 parallel to axis 12 and containing the normal 87 is tangent to involute base cylinder 89 at point 91. Provided a straight line element of the tool disposed in this normal plane 88 remains in contact with the surface 83 throughout the swinging and relative axial motion of the tool, and that the tool rotation axis 14 also lies in this normal plane, the tooth surface will be of the ideal involute helicoidal shape. That is, in FIG. 9 the tooth side 83 intersects the drawing plane, which is perpendicular to axis 12, in an involute of the circle in which cylinder 89 intersects the drawing plane. Similarly normal 92 to surface 84 at point 82 is tangent to involute base cylinder 93 at point 94. The surface 84 is an involute helicoid of this base cylinder 93 provided the axis 14, and the straight line element of the tool in contact with surface 84, both lie in plane 95 which is tangent to cylinder 93 and contains normal 92. For purposes of comparison with the intersection lines of surfaces 83 and 84 with the drawing plane, a circle 96 has been drawn in FIG. 9 through a mean point of the tooth space, the center of the circle being at 12.

The base cylinders are determined by the tooth angles and the relation between the swing of the tool and the infeed between the tool and gear along axis 12. Tooth side 83 is at a greater angle (in FIG. 8) to axis 12 than is tooth side 84. As manifest in FIG. 9 by tooth side 83 diverging from circle 96 more than does tooth side 84, the normal 87 is offset at a greater distance from axis 12 than normal 92. Base cylinder 89 is therefore of larger diameter than base cylinder 93. Moreover the normals and the normal planes 88, 95 are offset to opposite sides of axis 12.

Accordingly the opposite tooth surfaces 83, 84 must be produced in separate operations, with the tool axis 14 offset to opposite sides of the cradle axis 12, if these surfaces are to be involute helicoids and if the tool is to have a conical cutting surface. This method of cutting, while requiring two operations, has the advantage that face mill cutters having cutting edges which are straight in cutter axial section are easily manufactured, and the further advantage that the tooth shape is not affected by the diameter of the cutter or the inclination of the cutter axis relative to the cradle axis. The diameter and inclination are therefore limited only by the requirement that the non-cutting side of the tool be clear of the adjacent side of the tooth slot in all positions of the tool's helical motion along and about axis 12. This condition is met when each normal to the outside cutting profile of the tool, such as normal 87, intersects the tool axis 14 at a point between the profile intersection point, such as 81, and the tangent point with the base cylinder, such as point 91; and when each tangent point, such as 94, of the normals like 92 to the inside cutting profile of the tool, is between the profile intersection point, as 82, and the point of intersection of the normal with the tool axis.

When cutting is with a grinding wheel, as distinguished from a bladed cutter, the advantages corresponding to those mentioned above are that the wheel is easily dressed to conical shape and that a redressing of the wheel which results in a change in its diameter does not affect the involute helicoidal character of the tooth sides.

Figure 10:
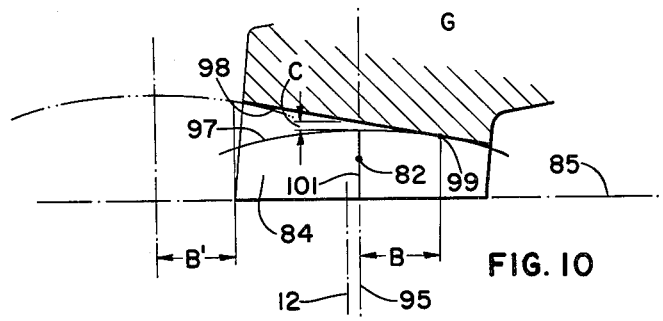
FIG. 10 is a diagrammatic view through a tooth space, substantially at right angles to both FIGS. 8 and 9.
Figure 11:
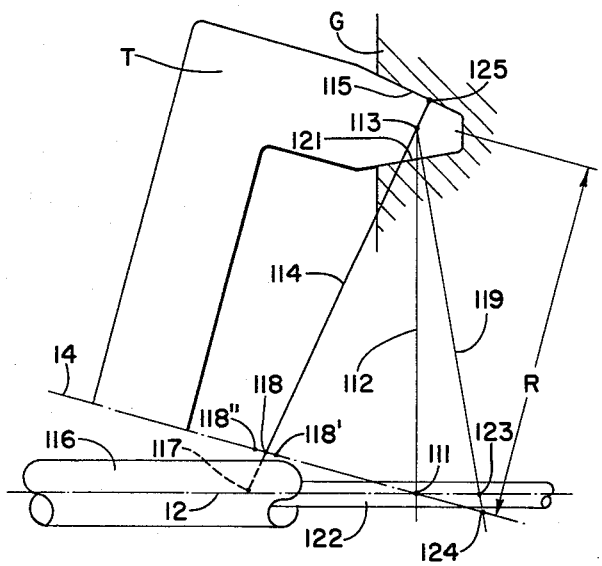
FIGS. 11 to 13 are views generally similar to FIGS. 8 to 10, illustrating a modification of the method whereby both sides of the tooth slots may be produced simultaneously.

However, where the tooth bottoms are to be cut at the same time as the tooth sides, the method requires suitable design of the bottom lands and fillets at the tooth bottom. Referring to FIG. 10, which is in a plane perpendicular to FIGS. 8 and 9, it will be seen that the tip cutting surface 97 of the tool is tangent to tooth bottom 98 at point 99, which is spaced by distance B from the line of contact 101 between the tool and the tooth side 84, this line of contact being in normal plane 95. This requires that, in order to complete the cutting of the tooth bottom, the swinging motion of the tool about axis 12 be increased by corresponding dimension B' over the amount necessary to cut the side 84. It also means that point 102 of the tool, FIG. 8, generates root fillet 103 of depth C, FIG. 10.

When the tool axis 14 is positioned to lie in other than normal plane 88 or 95, and the tool has a conical side cutting surface, i.e. has straight line elements in the tool axial plane, the tooth sides 83 and 84 produced are curved convexly in profile in their normal planes. When the opposite tooth sides are cut separately, the magnitude of this profile curvature may therefore be adjusted by varying the amount of offset of the cutter axis 14 from the cradle axis 12. When the opposite tooth sides are cut simultaneously, with a tool having two conical side cutting surfaces, and with the cutter axis in neither of the normal planes 88, 95, both tooth sides are made convex in normal plane profile. This is the condition, for example, when the cutter axis is positioned in the plane designated 104 in FIG. 9, containing the cradle axis 12. In such case the profile curvatures of the opposite tooth side surfaces may be balanced as desired, one being made more curved and the other less curved by adjustment of the offest of the tool axis 14 from the cradle axis 12. For example referring to FIG. 9, as the tool axis is adjusted out of plane 104 toward normal plane 95, the tooth side 84 will become more nearly straight in plane 95 and the tooth side 83 will become more convexly curved in normal plane 88.

The profile curvatures resulting from this method are small, especially so where the involute base cylinders are of small diameter as is always the case with fine pitch gears. Hence the method is well suited for the production of such gears, since it enables the use of a cutter having a greater number of blades than is possible with the method of cutting disclosed in afore-mentioned patent application Serial No. 705,931. For this same reason it is advantageous for the rough cutting of gears of coarse pitch that are subsequently to be finish cut by the method and machine of that application.

Opposite tooth sides having straight tooth profiles in their respective normal planes 88, 95 may also be produced simultaneously with the same tool, by giving the side cutting surfaces of the tool appropriate convex curvatures in the cutter axial plane. Where the tool is a face mill cutter, the side cutting edges may be ground to have such curvature, and where it is a grinding wheel the curvature may be dressed onto the wheel by means of a suitable dressing means, such for example as that disclosed in the co-pending application Serial No. 311,705, filed on even date herewith by myself and R. W. Treverton.

Figure 12:
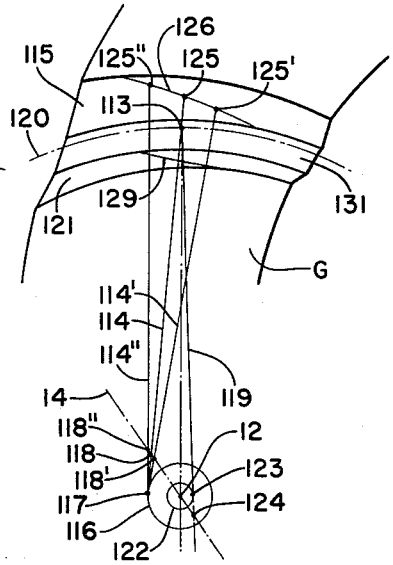
Figure 13:
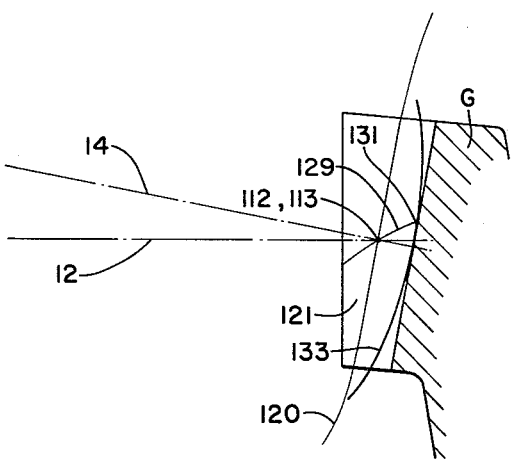
Figure 14:
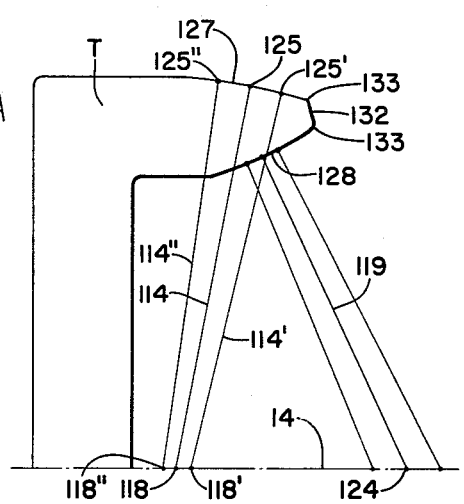
FIG. 14 is a view illustrating a method of determining the profile shape of the cutting tool employed with the method of FIGS. 11 to 13; and, FIGS. 15 and 16 are views like FIGS. 11 and 12 but illustrating a further modification of the cutting method.

FIGS. 11 to 14 illustrate schematically a case of simultaneous grinding of two tooth sides, where the tool axis 14 intersects cradle axis 12 at a point 111 so located that perpendicular 112 therethrough to axis 12 passes through mean point 113 of the tooth slot and lies in the normal plane of the helix 120, FIGS. 12 and 13, at point 113 determined by the lead of the helical motion used, set by the adjustment of slotted disc 64. A normal 114 to concave involute helicoidal tooth surface 115 extending through the mean point is tangent to base cylinder 116 at 117 and intersects the tool axis 14 at point 118. Similarly, a normal 119 through mean point 113 to the convex tooth surface 121 is tangent to base cylinder 122 at point 123 and intersects axis 14 at 124. Through other points spaced from point 118 along axis 14, such as points 118' and 118'', there are other normals to surface 115 such as those designated 114' and 114''. Normals 114', 114 and 114'' intersect the latter surface at points 125', 125 and 125'' lying along curve 126 on the surface. This curve 126 constitutes an instantaneous line of contact between a surface of revolution about axis 14 and the helicoidal tooth surface 115. By considering each normal, such as 114', and the profile of the helicoidal surface in the plane of the normal that is tangent to the cylinder 122, the length of the normal between axis 14 and point 125' on the helicoidal surface may be readily determined, as may also be the position of the point along said profile. Then, by considering the normal (114') in the plane common to it and the axis 14, its inclination to that axis can be determined. By rotating all of a succession of the normals, such as 114', 114 and 114'' about axis 14 into a common plane, such as that of FIG. 14, the convex curvature of profile 127 of this surface of revolution may be completely determined. By a like procedure, involving a series of normals like 119, a determination may be made of the convex profile curvature 128 of the surface of revolution about axis 14 which will have contact along curve 129 with involute helicoidal surface 121. With a milling cutter or grinding wheel T having these outside and inside profiles 127 and 128, the opposite involute helicoidal tooth sides 115 and 121 may be produced simultaneously, as the envelopes of successive positions of these profiles 127 and 128 in the helical path along and about axis 12. Also, as previously explained, the bottom land 131 and root fillets of the tooth slot may be produced at the same time by the tip surface 132 and points 133 of the tool. Because the tool axis is tilted into the plane normal to the mean helix 120 about axis 12 through the tooth slot, the fillets produced are identical with those produced by the method described in the afore-mentioned application Serial No. 705,931.

The method described with reference to FIGS. 11 to 14 is not restricted to the tool axis 14 intersecting cradle axis 12 at point 111, nor is intersection of these axes required. For example, as shown by FIGS. 15 and 16, which correspond generally to FIGS. 11 and 12, without any relocation of normals 114 and 119 through mean point 113, the axis 14 may be repositioned at a different inclination to cradle axis 12, and to offset relation thereto, and yet intersect the normals 114, 119. The respective intersection points are designated 118a and 124a. By comparing FIGS. 11 and 15, it will be apparent that this repositioning results in a different tool radius R. This freedom of choice in tool radius and inclination of tool axis, enables the selection of tools having adequate clearance from the work on each side of the instantaneous lines of contact (such as curves 126 and 129 in FIG. 12) and reasonable balance of the stock removal by the inside and outside cutting portions of the tool.

It will be understood that the illustrations pertaining to the cutting method, FIGS. 5 to 16, are not to scale, but are purely diagrammatic, being intended only to illustrate the principles involved.

It will also be understood that the description of the improved machine, and of several variations of the new method, is made by way of example, not by way of limitation, and that various modifications thereof may be made by those skilled in the art without departing from the invention or from the scope of the appended claims.

What I claim is:

1. The method of cutting a tooth slot of a non-generated spiral bevel or hypoid gear by swinging a rotating annular cutting tool about an axis which is inclined at an acute angle to the tool rotation axis, to thereby swing the tool substantially from end to end of the slot, the method comprising a relative infeed to full cutting depth between the tool and the gear preceding the swing motion, said infeed being substantially along the first-mentioned axis and being effected while the tool and gear are aligned for the cutting of one end of the slot to substantially full depth.

2. The method of claim 1 in which said first-mentioned axis is in a plane substantially perpendicular to the root plane of the tooth slot.

3. The method of claim 1 in which said first-mentioned axis is in a plane substantially perpendicular to the face plane of the tooth slot, and during said swing motion a relative feed is effected between the tool and the work along said first-mentioned axis to cut the tooth slot to said tapering depth.

4. The method of claim 3 in which said axes are in non-intersecting relationship.

5. The method of cutting an involute helicoidal tooth surface of a non-generated spiral bevel or hypoid gear with a rotating annular cutting tool whose rotation axis is inclined at an acute angle to the helix axis of said helicoidal surface, by simultaneously effecting relative motion between the tool and the gear along and around said helix axis to swing the tool along the tooth surface substantially from end to end thereof, such swing being effected while said rotation axis is maintained in such offset relation from the helix axis as to lie substantially in a plane tangent to the base cylinder of said helicoidal surface.

6. The method of cutting a helicoidal tooth surface of a non-generated spiral bevel or hypoid gear with a rotating annular cutting tool whose rotation axis is inclined at an acute angle to the helix axis of said helicoidal surface, by simultaneously effecting relative motion between the tool and the gear along and about said helix axis, to thereby swing the tool along the tooth surface substantially from end to end thereof, while maintaining said rotation axis offset from the helix axis.

7. The method of producing a non-generated bevel or hypoid gear, having opposite tooth sides which are helicoids having a common helix axis, with an annular tool rotating about its own axis, which is inclined to said helix axis, and moving the rotating tool relatively to the gear in a helical path about and along said helix axis with the convex and concave cutting surfaces of revolution of the tool simultaneously contacting the concave and convex tooth sides at opposite sides of the same tooth slot, and with each of said contacting cutting surfaces of revolution convexly curved in axial section profile.

8. The method of claim 7 wherein each of said surfaces of revolution is so curved convexly in axial section profile that the envelope of successive positions thereof in said helical path is substantially straight in a plane which is normal to the related tooth side and parallel to said helix axis.

9. The method of claim 7 in which the axis of the tool, during the relative motion in said helical path, lies in a plane normal to a mean helix through the tooth slot about said helix axis.

10. A gear cutting machine comprising a rotatably supported tool-carrying cradle, a work head rotatably supporting a work spindle, means including a frame supporting said cradle and head for relative feed motion in the direction of the cradle rotation axis and for relative adjustment (a) about an axis perpendicular to both the cradle rotation axis and the work spindle rotation axis, (b) in the direction of said perpendicular axis and (c) in the direction of said work spindle rotation axis, and said supporting means further comprising a slide adjustable in a direction at a right angle to said perpendicular axis and also at a right angle to one of the other aforementioned axes to enable the latter to be adjusted into either intersecting or offset relation to said perpendicular axis.

11. A machine according to claim 10 in which there is a spindle for a rotary cutting tool rotatably supported by the cradle for universal angular adjustment and radial adjustment thereon.

12. A gear cutting machine comprising a work gear support in an angularly movable tool carrier supporting a cutting tool for rotation thereon about an axis displaced from the angular motion axis of the carrier, feed cam means for effecting relative infeed and withdrawal between the support and the carrier in said direction, and, coordinated with said feed cam means, a carrier actuating cam for effecting said angular motion, the last-mentioned cam having a dwell effective during said relative infeed, whereby the tool may be brought to substantially full cutting depth at one end of a tooth slot of a work gear while being held against motion about said axis of angular motion, and may then be swung about the latter axis to cut the tooth slot to the opposite end thereof.

13. A machine according to claim 12 in which said feed cam means has a first feed section for effecting relative infeed between the work gear support and the tool carrier while said dwell of the actuating cam is effective, and has a second feed section for effecting relative motion between the carrier and the work gear support in the direction of the axis of angular motion while the tool is traversing the tooth slot, to cause said tool to move in a helical path during such traversal.

14. A machine according to claim 12 in which said work gear support includes a work spindle, and there is a mechanism coordinated with said feed cam means for indexing the spindle, to bring successive tooth spaces of a work gear into cutting position, when the support and carrier are relatively withdrawn.

15. A machine comprising a work gear support and an angularly movable tool carrier supporting a cutting tool for rotation thereon about an axis displaced from the angular motion axis, said support and carrier being arranged for relative infeed and withdrawal in the direction of said angular motion axis; a roll cam having forward and return paths for effecting forward and return strokes of said angular motion and a dwell path following said return path; a feed cam and a helical motion cam coordinated with the roll cam and arranged to differentially effect said relative infeed and withdrawal; said feed cam having a dwell effective during the forward stroke of the angular motion, a following withdrawal and dwell section for relatively separating the support and carrier for the return stroke of the angular motion, and an infeed section effective while the dwell of the roll cam is effective; and said helical motion cam having feed and return paths effective respectively during the forward and return strokes of the angular motion, and a dwell effective during said infeed by the feed cam.

16. Apparatus for producing non-generated bevel or hypoid gears whose tooth sides are helicoids, comprising an annular tool, means for supporting the tool for rotation about its own axis and for supporting the tool and work gear for relative helical motion along and about an axis inclined to the tool axis, to cause the tool to traverse a tooth space of the gear in a helical path from end to end thereof, the tool having inside and outside cutting surfaces of revolution for simultaneously cutting the opposite tooth sides of a tooth slot, which are convexly curved in axial section profile.

17. Apparatus according to claim 16, wherein each of said surfaces of revolution is so curved convexly in axial section profile that the envelope of successive positions thereof along said helical path is substantially straight in a plane normal to the related tooth side and parallel to the axis of helical motion.

References Cited by the Examiner
UNITED STATES PATENTS
3,110,225  11/63  Carlsen et al _____ 90—9.4

References Cited by the Applicant
UNITED STATES PATENTS
1,830,971  11/31  Taylor.
1,982,050  11/34  Gleason et al.
2,444,551   7/48  Bauer.
2,566,402   9/51  Critchley.
2,857,819  10/58  Wildhaber et al.

WILLIAM W. DYER, JR., *Primary Examiner.*